(12) United States Patent
Callister et al.

(10) Patent No.: US 8,219,780 B2
(45) Date of Patent: Jul. 10, 2012

(54) MITIGATING CONTEXT SWITCH CACHE MISS PENALTY

(75) Inventors: James R. Callister, Windsor, CO (US); Eric R. Delano, Fort Collins, CO (US); Rohit Bhatia, Ft. Collins, CO (US); Shawn Kenneth Walker, Ft Collins, CO (US); Mark M. Gibson, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1827 days.

(21) Appl. No.: 11/228,058

(22) Filed: Sep. 16, 2005

(65) Prior Publication Data

US 2007/0067602 A1    Mar. 22, 2007

(51) Int. Cl.
  *G06F 12/00*    (2006.01)
(52) U.S. Cl. ........ 711/207; 711/128; 711/200; 711/202; 711/203; 711/204; 711/205; 711/206; 711/208
(58) Field of Classification Search .................. 711/128, 711/200–208
See application file for complete search history.

(56) References Cited

U.S. PATENT DOCUMENTS

| | | | |
|---|---|---|---|
| 6,263,403 B1 | 7/2001 | Traynor | |
| 6,604,187 B1 * | 8/2003 | McGrath et al. | 711/209 |
| 6,738,888 B2 * | 5/2004 | Chauvel | 711/207 |
| 6,745,306 B1 * | 6/2004 | Willman et al. | 711/163 |
| 2002/0062425 A1 | 5/2002 | Chauvel | |
| 2002/0069327 A1 | 6/2002 | Chauvel | |
| 2004/0268071 A1 | 12/2004 | Khan et al. | |

* cited by examiner

*Primary Examiner* — Tuan Thai
*Assistant Examiner* — Zhuo Li

(57) ABSTRACT

Systems, methodologies, media, and other embodiments associated with mitigating the effects of context switch cache and TLB misses are described. One exemplary system embodiment includes a processor configured to run a multi-processing, virtual memory operating system. The processor may be operably connected to a memory and may include a cache and a translation lookaside buffer (TLB) configured to store TLB entries. The exemplary system may include a context control logic configured to selectively copy data from the TLB to the data store for a first process being swapped out of the processor and to selectively copy data from the data store to the TLB for a second process being swapped into to the processor.

17 Claims, 9 Drawing Sheets

MITIGATING CONTEXT SWITCH CACHE MISS PENALTY

BACKGROUND

Multiprocessing systems may share system resources including a cache memory and a translation lookaside buffer (TLB). When a processor makes a context switch, for example when a first process is swapped out of a processor and a second process is swapped into the processor, some state (e.g., working set data) associated with the process being swapped out may typically be cast out of fast memory (e.g., cache memory). By way of illustration, cache entries and TLB entries associated with the process being swapped out may be discarded or written back to memory. Working set data of the process being swapped out may be cast out because cache memory locations and TLB entries may be scarce and may be needed by a process being swapped in. Since the cache entries and TLB entries are discarded, when that process is swapped back in it may need to recreate its working set. Thus, cache memory misses may occur even for memory locations previously the subject of a cache miss. These cache misses are part of performance penalties associated with context switching.

Cache entries may have been written as the result of a cache miss and TLB entries may have been established as the result of a TLB miss and/or physical/virtual address translation. Unfortunately, the time spent resolving a cache miss, resolving a TLB miss, and/or translating a physical/virtual address may be wasted when the cache entry and/or TLB entry are discarded when a process is unloaded in a multiprocessing system. Additionally, the process being swapped in will be "starting from scratch" with respect to some aspects of its working set including cache entries and TLB entries. Thus, for a process swapped out and in cache misses may need to be resolved time and time again, TLB misses may need to be resolved multiple times, and physical/virtual addresses may need to be translated over and over.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
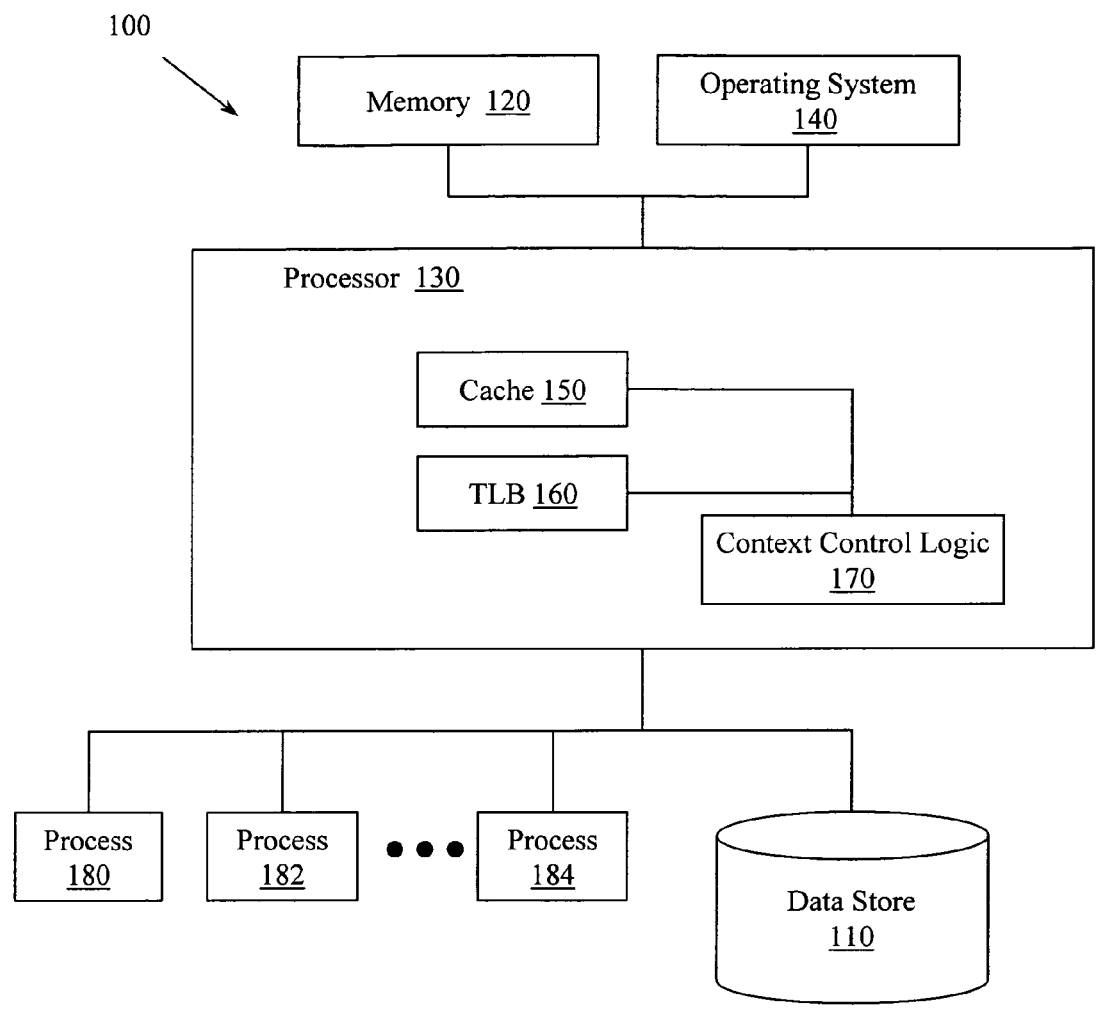
FIG. 1 illustrates an example system configured to facilitate mitigating performance issues associated with cache misses associated with context switching.

Example systems, methods, media, and other embodiments described herein facilitate mitigating some effects of cache and TLB misses related to process context switching in a multiprogramming, virtual memory computing system. Performance degradation due to repeatedly resolving cache and TLB misses is mitigated by storing data associated with a process working set when a process is unloaded from a processor. The process working set may include, for example, cache contents, cache state, cache addresses, TLB contents, TLB state, TLB addresses, and so on. In one example, the data saved from the working set will include a virtual address found in a TLB and a cache bit vector stored in the TLB.

In some cases it is reasonable to assume that a process that loaded data from main memory to cache in an earlier execution cycle will use that same data in a later execution cycle. Thus, performance degradation may be mitigated by acquiring saved working set state and/or data for a process being loaded into a processor. By way of illustration, TLB virtual addresses and related cache bit vectors may be retrieved for a process being swapped into a processor. Based on the TLB virtual addresses and the related cache bit vectors, data from memory may be read and stored in a cache memory. This may reduce cache misses when and/or if the process accesses that memory location.

In one example, fields are added to a TLB to facilitate knowing which cache entries and TLB entries are related to a process and should therefore be stored when a process is swapped out. The new TLB fields may include a touched bit field that indicates whether a TLB entry was used by the process being swapped out. The new TLB fields may also include a cache bit vector having a bit for each cache line mapped to the TLB entry that was used by the process. Loads that a process performs cause a touched bit to be set in a TLB entry and cause a bit to be set in the bit vector for a corresponding cache line. Storing a virtual address and a bit vector during a context unload operation therefore provides data that can be accessed to reduce cache misses when a process is reloaded.

When a process is swapped out, a new instruction may be executed as part of the context switch. For example, when an operating system switches a process out of the processor the operating system may issue a context_unload instruction that is tasked with storing relevant data like TLB entries. In one example, the context_unload instruction may have the form:

```
last_address = context_unload buffer_address, length
where:
last_address = the last address written with cache/TLB data
buffer_address = address to write cache/TLB data
length = amount of data that can be written.
```

While two arguments and one result are illustrated for the context_unload instruction it is to be appreciated that other examples may have different numbers of arguments and/or results. In one example, last_address may be the address of the last data written and buffer_address may be the address of the first data written. Last_address and/or buffer_address may be stored, for example, in a register. In the example, buffer_address may store a starting address in a data store, logical and/or physical, in which the TLB data is to be written. In the example, length may designate the maximum amount of TLB data that may be stored. Since the amount of TLB data available to be written may exceed the maximum amount of TLB data that may be written by a context_unload instruction, in some cases some TLB data may still be discarded. However, saving even some TLB data can mitigate performance degradation incurred in context switching.

In one example, a context_unload instruction may perform the following actions in the following order:
disallow updates to new TLB fields;

```
scan new TLB fields;
for touched fields:
    write TLB entry virtual address and cache vector to data store;
    clear TLB fields after writing;
    continue until all TLB entries scanned or length reached;
write last_address with address of last data written.
```

Similarly, when a process is swapped in, a new instruction may be executed as part of the context switch. For example, a context_load instruction may retrieve stored data like TLB entries and then, based on the retrieved TLB entries, retrieve cache entries. In one example, the context_load instruction may have the form:

```
destination = context_load buffer_address, length
where:
destination = a value indicating instruction completion,
buffer_address = address to read cache/TLB data,
length = size of buffer.
```

Once again, while two arguments and one result are described, it is to be appreciated that other examples may have different numbers of arguments and/or results. In one example, buffer_address may hold an address in a data store, logical and/or physical, at which the TLB data was stored by an earlier context_unload and from which TLB data will be read. In the example, length may store the amount of TLB data to acquire from the data store.

In one example, the context_load instruction may perform the following actions in the following order:

```
acquire TLB entries (e.g., virtual address, cache bit vector);
cache data from memory based on TLB entries;
clear touched bit and bit vector in TLB entries for cached data;
write completion value.
```

The context_load instruction may be issued, for example, by an operating system but may not start operation until after the next RFI (return from interrupt). This timing will permit protection mechanisms to work for incoming processes and thus prevent invalid memory accesses and so on.

Note that the context_load instruction may work asynchronously with other instructions, except those that may read or write the destination register. It may work asynchronously because its operation may overlap with instructions performed by the swapped in process. Thus, in certain situations, the swapped in process may perform an operation that causes a cache miss or TLB miss even though information that could have prevented the miss may have been stored by a previous context_unload instruction.

Example systems and methods may also facilitate capturing information useful for performance monitoring and/or process characterization. By way of illustration, performance monitoring logics and/or methods may record and/or tabulate information available during context (un)loading. This information may include, for example, how many cache lines a process used, whether a particular address was used, how many TLB entries a process used, and so on. This information may facilitate more accurately characterizing process properties including a process working size, a process working set, which memory locations are being shared, what data is being shared, and so on. Since TLB and/or cache state is conventionally discarded, this type of information has not typically been available.

Example systems and methods may also facilitate more intelligently handling TLB and cache misses experienced while previously stored working set data is still being retrieved. TLB and/or cache misses may occur while a context load is occurring because in some examples the swapped in process may execute substantially in parallel with the context load operation. Rather than handling each TLB and/or cache miss individually, misses experienced during a context loading operation may be vectored to a unique interrupt vector and thus to an interrupt service routine (ISR) configured to handle the TLB miss that caused the interrupt and also configured to acquire cache/TLB information and/or data that may not yet have been loaded after a context switch. The ISR may reduce side effects like TLB faults during context switching.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a hard disk, a magnetic tape, other magnetic medium, a CD-ROM, other optical medium, a RAM (random access memory), a ROM (read only memory), an EPROM, a FLASH-EPROM, or other memory chip or card, a memory stick, and other media from which a computer, a processor or other electronic device can read.

"Data store", as used herein, refers to a physical entity that can store data. A data store may be, for example, a queue, a heap, a memory, a register, and so on. A data store may reside in one physical entity and/or may be distributed between two or more physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be considered to be operably connected if they are able to communicate signals to each other directly or through one or more intermediate entities like a processor, an operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"User", as used herein, includes but is not limited to one or more persons, software, computers or other devices, or combinations of these.

FIG. 1 illustrates an example system 100 that is configured to facilitate mitigating performance issues associated with cache misses associated with context switching. System 100 may include a data store 110. The data store 110 may be, for example, a memory, a register file, a cache, and so on. While data store 110 is illustrated outside processor 130, in some examples data store 110 may be located inside processor 130.

System 100 may also include a memory 120. Memory 120 may be, for example, a random access memory (RAM) configured to store values used by processes that run on processor 130. While memory 120 may be addressed physically, operating system 140 and processor 130 may cooperate to treat memory 120 as a virtual memory. Thus, there may be times when a physical address will be translated to a virtual address and vice versa. Furthermore, there may be times when data is read from memory 120 and cached in processor 130.

System 100 may also include a processor 130 that is configured to run a multiprocessing, virtual memory operating system 140. Processor 130 may be operably connected to memory 120. Processor 130 may include a cache 150 and a TLB 160. The cache 150 may store values retrieved from memory 120. The TLB 160 may be configured to store TLB entries having various fields including, for example, a physical address, a virtual address, a touched field, and a cache line field. The physical address and virtual address facilitate storing a virtual/physical address translation used by the virtual memory operating system 140 and the processor 130. The touched field describes whether a TLB entry was used by a process being swapped out of the processor 130. The cache line field describes whether a cache line mapped to the TLB entry was used by a process being swapped out of the processor 130. Having the touched field and the cache line field available facilitates determining whether a process being swapped out has established a working set of cache entries which in turn facilitates selectively storing addresses and other data useful for recreating that working set of cache entries when the process is swapped back into processor 130.

Processor 130 may also include a context control logic 170 that is configured to selectively copy data from the TLB 160 to a location from which it may be retrieved. The location may be, for example, memory 120, and/or data store 110. The data may be associated with a process (e.g., 180) being swapped out of the processor 130 by the operating system 140. In one example, the data copied from the TLB 160 may include a virtual address and a cache line field value. Which data is copied may depend, at least in part, on the value of the touched field in a TLB entry. In one example, data will be copied from the TLB 160 only when the cache 150 and/or TLB 160 are nearing a threshold utilization point making it likely that an incoming process would require resources that if allocated would cause another process' working set to be discarded and lost. In another example, data will be copied from the TLB 160 when incoming processes collectively will displace outgoing process state.

The context control logic 170 may also be configured to copy data from a location in which it was saved (e.g., memory 120, data store 110) to the TLB 160. This data may be associated with a process (e.g., 182) being swapped into the processor 130 by the operating system 140. The data may be TLB information that facilitates deciding which, if any, values to read from memory 120 into cache 150 to minimize duplicating cache misses.

Thus, the context control logic 170 may be configured to selectively copy data from the memory 120 to the cache 150. Which data, if any, that is copied may be determined, at least in part, on the data (e.g., virtual address) copied to the TLB 160.

The context control logic 170 may be configured to copy data to the TLB 160 and from the memory 120 to the cache 150 asynchronously with respect to other instructions performed by the processor 130. While some TLB data and/or cache values may be pre-fetched (e.g., read before a process swapped in starts to execute), other TLB data and/or cache values may be overlap-fetched (e.g., read after the process swapped in starts to execute). The copying may proceed asynchronously after an RFI (Return From Interrupt) is issued by the processor 130 initiating a context switch. Since a process may access a memory location before the value for that memory location has been fetched as part of a context loading operation, an interrupt vector and an interrupt service routine may be supplied to handle TLB misses experienced while a context loading operation is in progress. The interrupt service routine may acquire all remaining data to help prevent further similar occurrences.

The system 100 may also include a performance monitoring logic (not illustrated) that is configured to acquire information for characterizing processes and their resource usage. For example, the performance monitoring logic may gather information concerning properties including how many cache lines are used by a process executing on the processor 130, how many TLB entries are used by a process executing on the processor 130, which addresses were used by a process executing on the processor 130, which addresses were shared by two or more processes executing on the processor 130, and so on.

Figure 2:
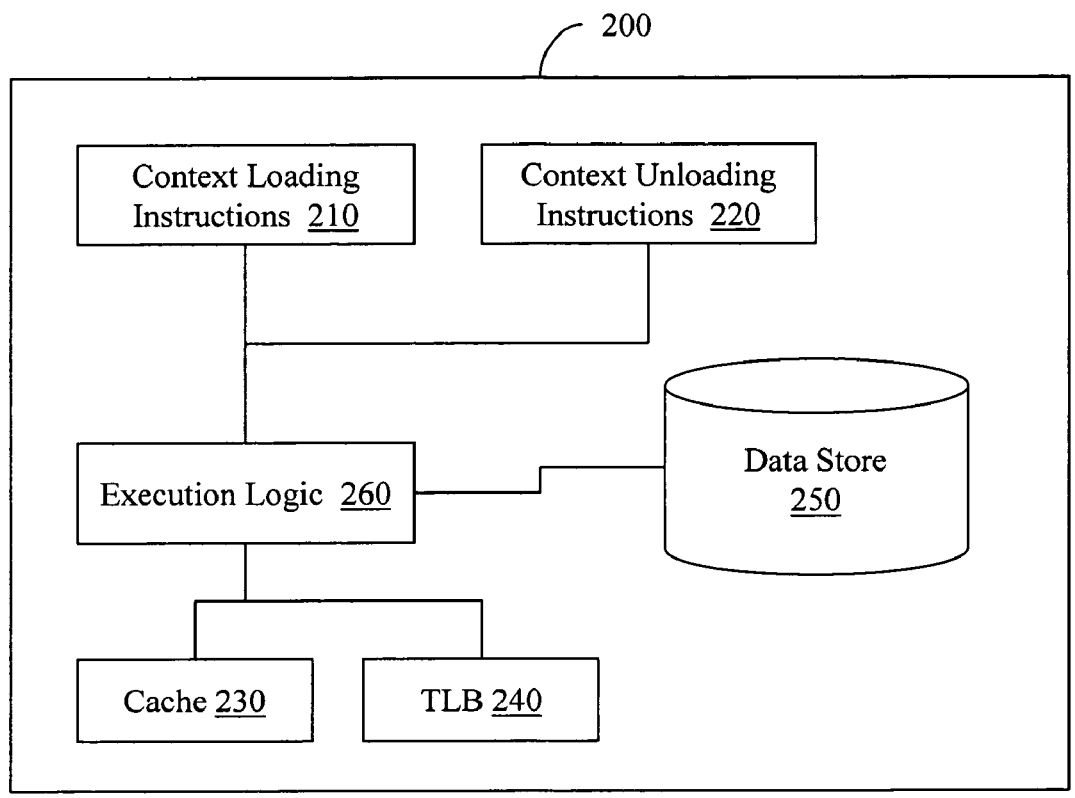
FIG. 2 illustrates an example microprocessor configured to facilitate mitigating performance issues associated with cache misses associated with context switching.

FIG. 2 illustrates an example microprocessor 200 configured to facilitate mitigating performance issues associated with cache misses associated with context switching. Microprocessor 200 may include a source 210 of context loading instructions. A context loading instruction loads TLB information related to an inbound process being loaded into the microprocessor 200 as part of a context switch. The inbound process may have executed previously and may have experienced cache misses and TLB misses. Thus, to reduce duplicating processing required to resolve cache misses and TLB misses that were resolved during prior execution, information may have been stored for the process when it was swapped out.

Microprocessor 200 may also include a source 220 of context unloading instructions. A context unloading instruction stores information related to an outbound process being unloaded from the microprocessor 200 as part of a context switch. This information may describe TLB and/or cache state and thus may be used to recreate those states when a process is swapped back in.

Microprocessor 200 may include a cache memory 230 that includes a plurality of cache lines. In one example, a cache line may be 128 bytes in size. Microprocessor 200 may also include a translation lookaside buffer 240 (TLB) that is configured to store TLB entries. The TLB entries may include a physical address field and a virtual address field that store a physical/virtual address translation employed by a process executing on microprocessor 200. The TLB entries may also include a touched field that stores a value that indicates whether a TLB entry has been accessed by an outbound process. The touched field may be, for example, a single bit field. The TLB entries may also include a cache line field that stores a value that indicates whether a cache line related to the TLB entry has been accessed by an outbound process. In one example the cache line field may be thirty two bits wide, a cache line may include 128 bytes of data, and each TLB entry may be related to 32 cache lines.

Microprocessor 200 may also include a data store 250 that receives TLB information provided by the context unloading instructions and provides TLB information requested by the context loading instructions. Data store 250 may be, for example, a cache memory, a register file, a random access memory, and so on.

Microprocessor 200 may also include an execution logic 260 that is configured to execute context loading instructions and context unloading instructions. Executing a context unloading instruction may include selectively copying a portion of a TLB entry into a location from which it can be retrieved later (e.g., data store 250). The portion may be, for example, a virtual address and cache line data. Which virtual address(es) and cache line data is copied may depend, at least in part, on the touched field of the TLB entry. For example, if the touched field indicates that the TLB entry was used by the process being swapped out, then the virtual address and cache line data may be copied. Executing a context loading instruction may include selectively copying data like portions of a TLB entry from a location in which it was stored previously (e.g., data store 250) into TLB 240. Whether data is copied to TLB 240 may depend on process ownership. For example, if a process being swapped into processor 200 has not run before, then it will not own any data in data store 250 and none will be copied. However, if a process being swapped into processor 200 has run before and resolved TLB misses and/or cache misses, then data concerning these misses may be stored in data store 250.

Context loading and/or unloading instructions may have various syntax and various semantic forms. In one example, a context unload instruction may have the form:

result=name op1,op2 where name is the instruction name, result is the last address written in the data store 250 during a context unload operation, op1 is an address at which data is to be stored in the data store 250 during the context unload operation, and op2 is the amount of data that can be stored by a context unload instruction. As described above, an outbound process working set may exceed the size of the area allocated in data store 250 for that process. Thus, in some examples, some TLB entries may not be stored in data store 250.

Figure 3:
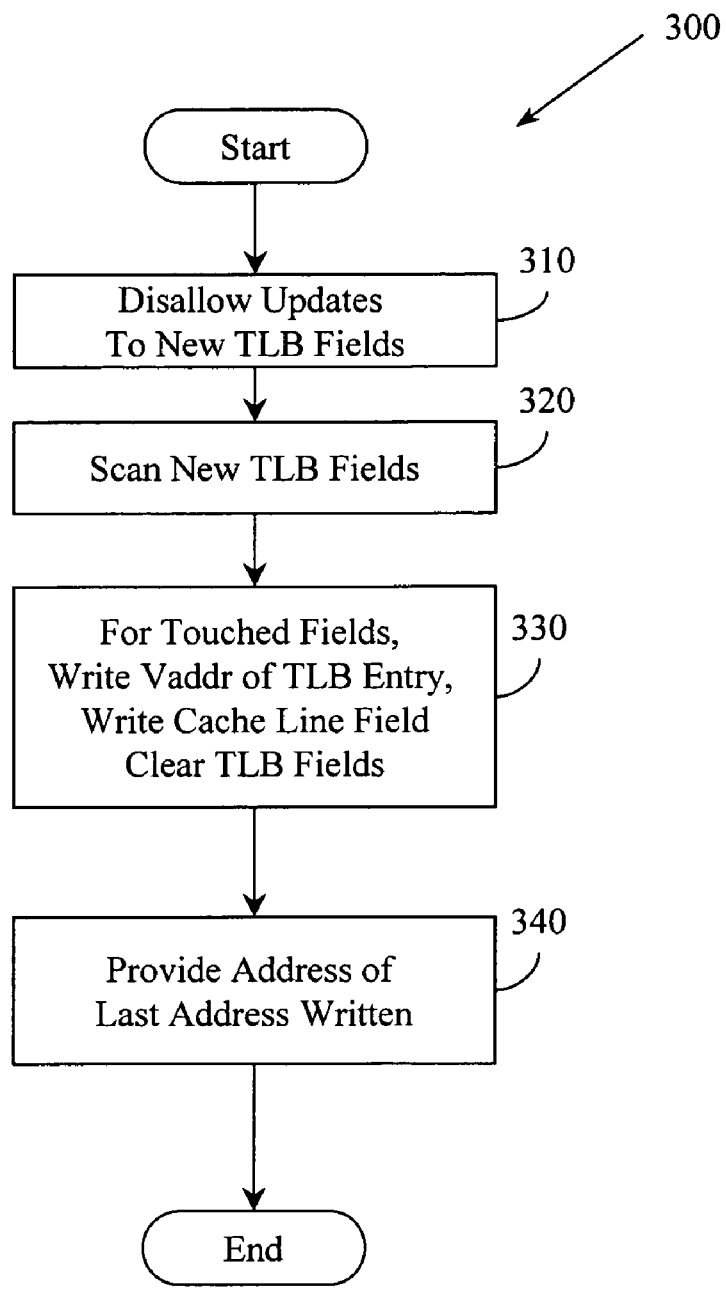
FIG. 3 illustrates an example method associated with saving cache and/or TLB state upon a context switch.

A context unload instruction may perform the following actions as illustrated by method 300 in FIG. 3. At 310, the instruction may block updates to the touched field and the cache line field while the context unload instruction is executing. At 320, the instruction may examine TLB entries. The instruction may continue examining TLB entries until all TLB entries have been examined and/or until the amount of data specified by op2 has been written to the data store 250 during a context unloading operation. At 330 the instruction may, in response to detecting a touched field that indicates that a TLB entry was accessed by the outbound process, provide the virtual address in the TLB entry to the data store 250, provide the cache line field in the TLB entry to the data store, and clear TLB fields for the TLB entry from which the virtual address and the cache line field were acquired. At 340, the instruction may conclude by providing the address of the last location written in the data store by the context unloading instruction.

A context loading instruction may have different forms. In one example, a context load instruction may have the form:

result=name op1,op2 where name is the instruction name, result is a known value indicating instruction completion, op1 is an address in the data store 250 from which data is to be acquired, and op2 is an amount of data to be acquired.

Figure 4:
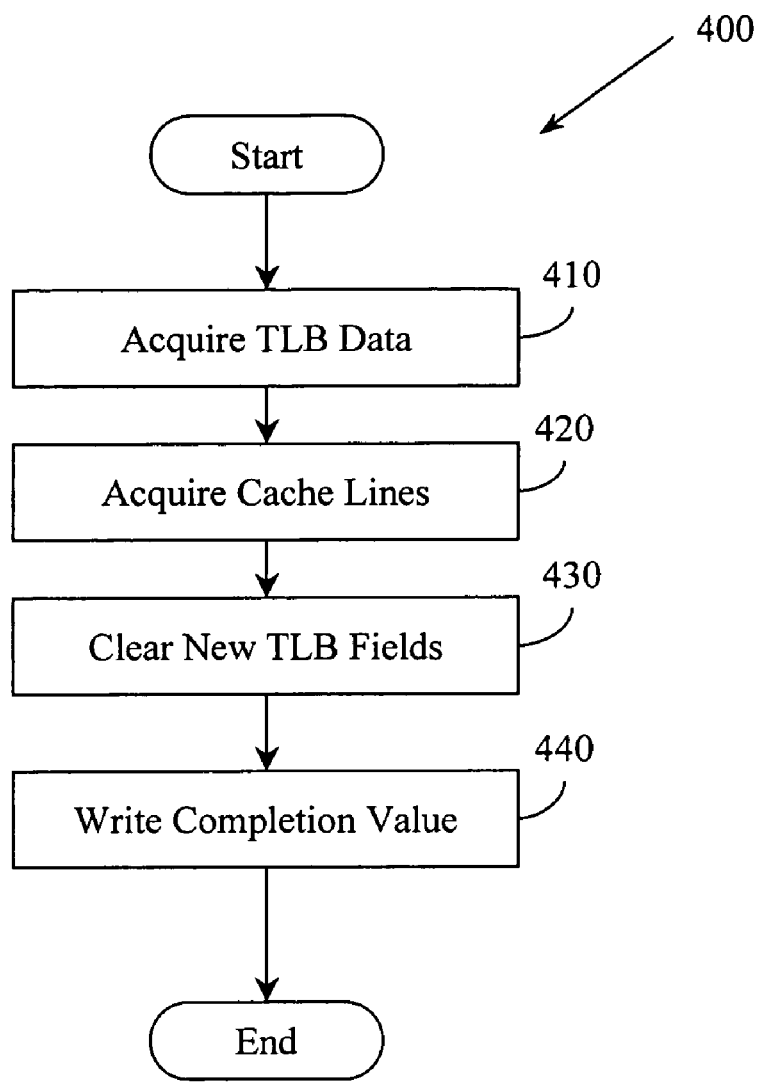
FIG. 4 illustrates an example method associated with loading cache and/or TLB state upon a context switch.

In one example, a context load instruction may perform the following actions as illustrated by method 400 in FIG. 4. At 410, the instruction may acquire at least a portion of a TLB entry from the data store 250 and may write the portion of the TLB entry into an entry in the TLB. At 420, the instruction may selectively acquire a value from a memory and write the value into the cache memory 230 based, at least in part, on the portion of the TLB entry. Thus, data may be acquired from memory and cache lines may be written with the data. At 430, the instruction may clear the touched field and cache line field for the TLB entry. Thus, if the cache lines written are not accessed by the process being swapped in, their related TLB entries will not be written to data store 250 when the process is subsequently swapped out. However, if the touched bit or the cache line fields are manipulated to indicate that the cache lines are accessed, then their related TLB entries will once again be written to data store 250. At 440, the instruction may provide a completion value that indicates that the context load instruction has finished receiving portions of TLB entries from the data store 250 and has finished reading values from memory into cache.

Microprocessor 200 may also include, (not illustrated), a performance monitoring logic. The performance monitoring logic may acquire information concerning process properties including a number of cache lines used by a process executing on the microprocessor 200, a number of TLB entries used by a process executing on the microprocessor 200, an address used by a process executing on the microprocessor 200, an address shared by two or more processes executing on the microprocessor 200, and so on.

Microprocessor 200 may also include a context unload interrupt vector that facilitates invoking a context load TLB miss interrupt service routine. This interrupt service routine may be invoked when a TLB miss occurs while a context load instruction is being performed.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that in different examples, various actions could occur concurrently, substantially in parallel, and/or at substantially different points in time.

Figure 5:
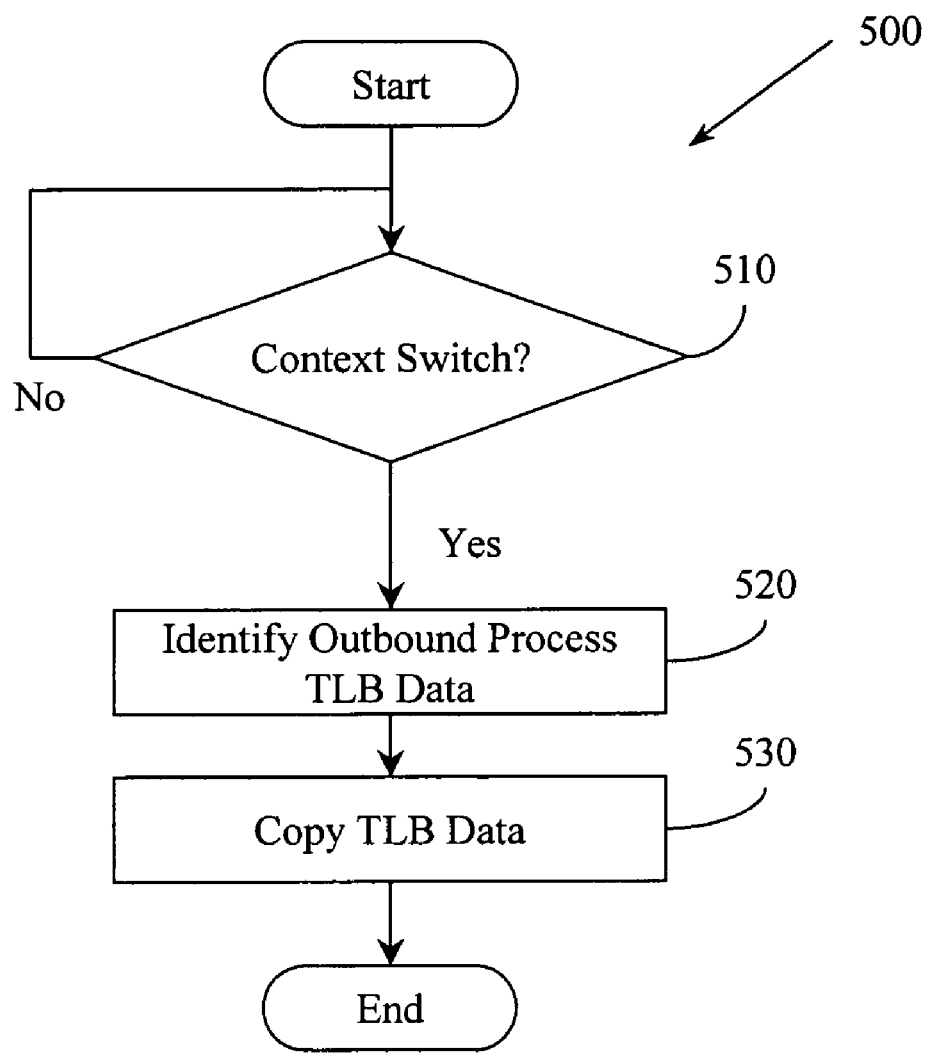
FIG. 5 illustrates an example method associated with mitigating cache miss penalties associated with context switching.

FIG. 5 illustrates an example methodology 500 associated with mitigating cache miss penalties associated with context switching. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, described methodologies may be implemented as processor executable instructions and/or operations provided by a computer-readable medium. In another example, processing blocks may represent functions and/or actions performed by functionally equivalent circuits like an analog circuit, a digital signal processor circuit, an application specific integrated circuit (ASIC), or other logic device.

It will be appreciated that electronic and software applications may involve dynamic and flexible processes such that the illustrated blocks can be performed in other sequences different than the one shown and/or blocks may be combined or separated into multiple components. Blocks may also be performed concurrently, substantially in parallel, and/or at substantially different points in time. They may also be implemented using executable code produced using various programming approaches like machine language, procedural, object oriented and/or artificial intelligence techniques.

FIG. 5 illustrates an example method 500 associated with mitigating penalties associated with cache misses due to context switches. Method 500 may include, at 510, determining that a context switch is in progress on a processor configured with a TLB. This determination may be made, for example, by identifying information provided by an operating system that decided to initiate a context switch. When the determination is made, processing may continue at 520.

At 520, method 500 may include identifying a TLB data associated with an outbound process. The TLB data may be, for example, a virtual address and a vector that identifies which, if any, cache line entries mapped to the TLB entry were employed since the last context switch and thus were used by a process being swapped out. In one example, identifying the TLB data associated with the outbound process comprises examining TLB entries to determine whether a TLB entry has been modified by the outbound process. Whether the TLB entry has been modified may be reflected in an additional field (e.g., touched bit) in a TLB entry.

Method 500 may also include, at 530, selectively copying the TLB data to a location from which it may be retrieved (e.g., memory, data store). Since the location may not have capacity for every TLB entry associated with an outbound process, some entries may not be copied. In one example, the data may be copied to and/or from the location using a register stack engine like process.

Method 500 may also include, not illustrated, computing performance monitoring data from the TLB data. The performance monitoring data may include, for example, a cache line count, a TLB entry count, a shared address identifier, and so on. Thus, unlike conventional methods in which data concerning process operating parameters like working set size, address re-use, and so on is not available, method 500 facilitates acquiring additional data that is useful for monitoring performance.

Method 500 may also include, (not illustrated), determining that an inbound process and/or a set of inbound processes will require a resource(s) that is/are unavailable. The resource may be, for example, a TLB entry, a cache line, and so on. In one example, the type of resource that will be required will be the type of resource for which working set data can be saved to facilitate recreating state held in the resource.

The determination may concern identifying whether incoming processes will collectively displace the state of the outgoing process.

While FIG. 5 illustrates various actions occurring in serial, it is to be appreciated that various actions illustrated in FIG. 5 could occur substantially in parallel. By way of illustration, a first process could determine whether to copy outbound process data, a second process could identify outbound process TLB data, and a third process could copy out TLB data. While three processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform a method that includes determining that a context switch is in progress on a processor configured with a TLB and determining that an outbound process state will be lost. The method may also include identifying a TLB data associated with an outbound process by examining TLB entries to determine whether a TLB entry has been modified by the outbound process. The method may also include selectively copying out the TLB data. The method may also include determining that an inbound process has a stored TLB information available, acquiring the stored TLB information, and writing the stored TLB information to the TLB. While the above method is described being stored on a computer-readable medium, it is to be appreciated that other example methods described herein can also be stored on a computer-readable medium.

Figure 6:
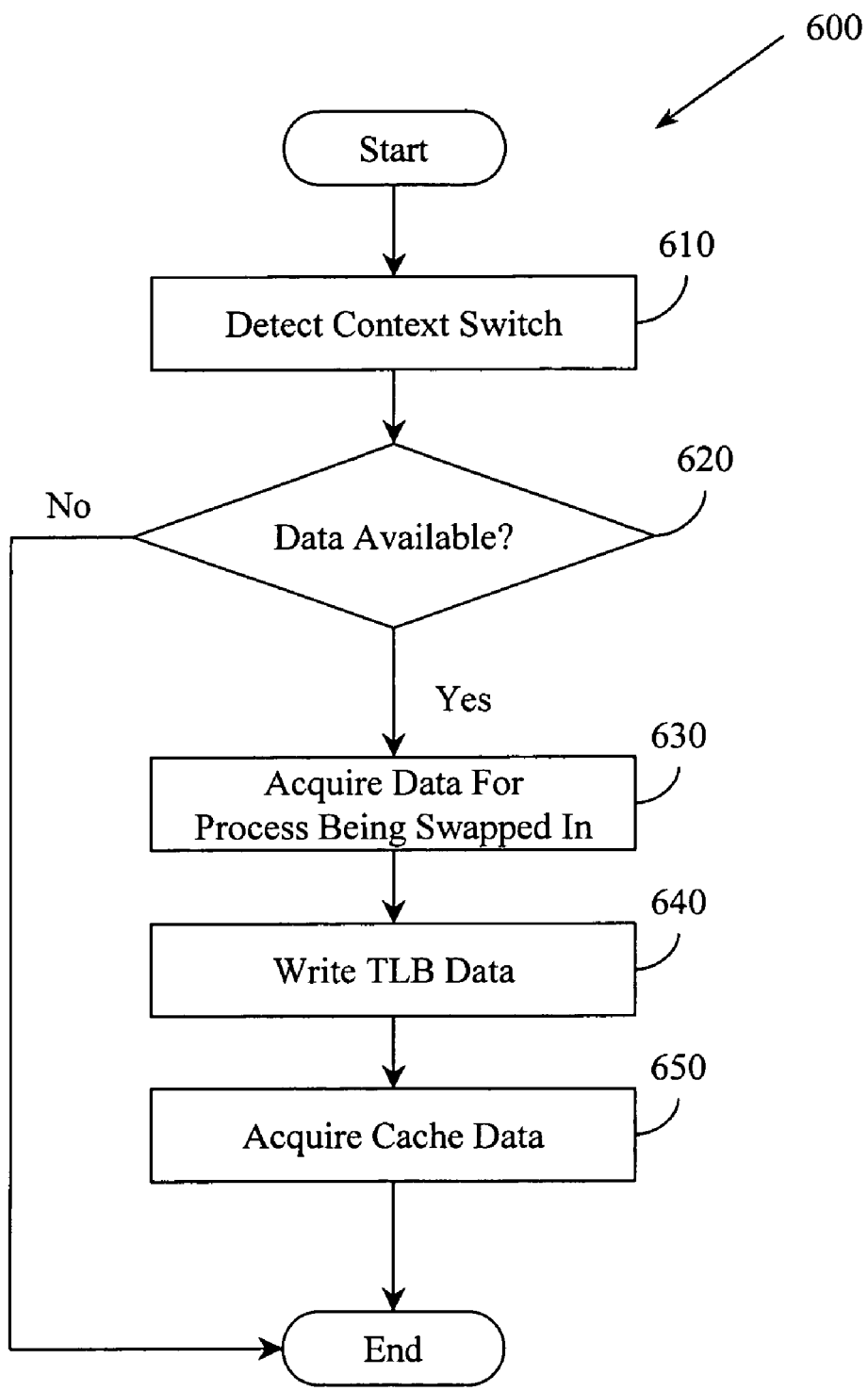
FIG. 6 illustrates an example method associated with mitigating cache miss penalties associated with context switching.

FIG. 6 illustrates an example method 600 associated with mitigating penalties associated with cache misses due to context switches. Method 600 may include, at 610, determining that a context switch is in progress on a processor configured with a TLB. Method 600 may also include, at 620, determining that an inbound process has stored TLB information available. The TLB information may have been stored when a process was swapped out of a processor. The TLB information may facilitate recreating state (e.g., TLB state, cache state) for the process that was swapped out of the processor.

If the determination at 620 is Yes, then method 600 may proceed at 630 to acquire the stored TLB information and at 640 to write the stored TLB information to the TLB. In one example, the TLB information may be read from a register file using a register stack engine approach. In the example, the TLB information may include a virtual address and a value that relates a TLB entry to one or more cache lines. Since cache lines hold values retrieved from main memory, the TLB information may be configured to facilitate selectively acquiring values from main memory locations operably connected to the processor. To mitigate cache miss penalties associated with context switching (e.g., repetitively resolving cache misses), the main memory locations from which the values are acquired will likely be those previously accessed by the inbound process. Thus, method 600 may include, at 650, acquiring values from main memory and storing them in a cache.

In one example, the values may be acquired substantially in parallel with the inbound process executing. Thus, it is possible that a cache miss and/or a TLB miss may occur while the values are being retrieved from main memory. Thus, method 600 may include, (not illustrated), detecting that a TLB miss has occurred and vectoring an interrupt associated with the TLB miss to a context load miss interrupt handler.

Figure 7:
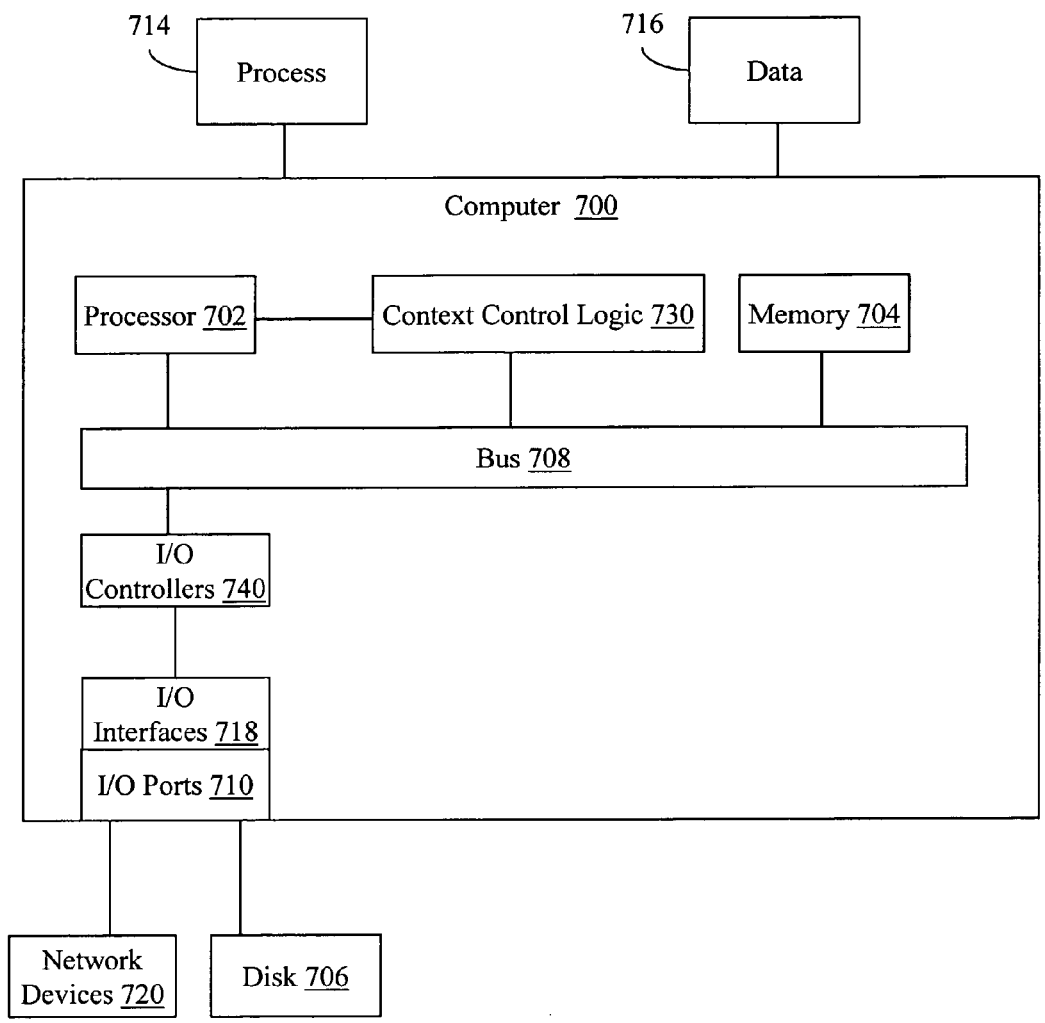
FIG. 7 illustrates an example computing environment in which example systems and methods illustrated herein can operate.

FIG. 7 illustrates an example computing device in which example systems and methods described herein, and equivalents, can operate. The example computing device may be a computer 700 that includes a processor 702, a memory 704, and input/output controllers 740 operably connected by a bus 708. In one example, the computer 700 may include a context control logic 730 configured to facilitate (un)loading TLB information during context switching.

While context control logic 730 is illustrated as a hardware component attached to bus 708, it is to be appreciated that in one example, context control logic 730 could be implemented in processor 702. Context control logic 730 may therefore provide means (e.g., hardware, software firmware) for determining that a process being swapped into processor 702 will require a TLB resource and/or a cache resource that is unavailable. Context control logic 730 may also provide means (e.g., hardware, software, firmware) for identifying and storing TLB information and cache information associated with the process being swapped out of the processor 702 and means (e.g., hardware, software firmware) for acquiring stored TLB information associated with a process being swapped into the processor 702. Context control logic 730 may also provide means (e.g., hardware, software, firmware) for acquiring TLB and cache performance information associated with the process being swapped into the processor and/or the process being swapped out of the processor.

Generally describing an example configuration of computer 700, processor 702 can be a variety of various processors including dual microprocessor and other multi-processor architectures. Memory 704 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to computer 700 via, for example, an input/output interface (e.g., card, device) 718 and an input/output port 710. Disk 706 may be, for example, devices like a magnetic disk drive, a solid state disk drive, a floppy disk drive, a tape drive, a Zip drive, a flash memory card, and/or a memory stick. Furthermore, disk 706 may be devices like optical drives (e.g., a CD-ROM), a CD recordable drive (CD-R drive), a CD rewriteable drive (CD-RW drive), and/or a digital video ROM drive (DVD ROM). Memory 704 can store processes 714 and/or data 716, for example. Disk 706 and/or memory 704 can store an operating system that controls and allocates resources of computer 700.

Bus 708 may be a single internal bus interconnect architecture and/or other bus or mesh architectures. While a single bus is illustrated, it is to be appreciated computer 700 may communicate with various devices, logics, and peripherals using other busses that are not illustrated (e.g., PCIE, SATA, Infiniband, 1394, USB, Ethernet). Bus 708 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 700 may interact with input/output devices via i/o interfaces 718 and input/output ports 710. Input/output devices can include, but are not limited to, a keyboard, a microphone, a pointing and selection device, cameras, video cards, displays, disk 706, network devices 720, and the like. Input/output ports 710 may include but are not limited to, serial ports, parallel ports, and USB ports.

Computer 700 may operate in a network environment and thus may be connected to network devices 720 via i/o devices 718, and/or i/o ports 710. Through network devices 720, computer 700 may interact with a network. Through the network, computer 700 may be logically connected to remote computers. The networks with which computer 700 may interact include, but are not limited to, a local area network (LAN), a wide area network (WAN), and other networks. Network devices 720 can connect to LAN technologies including, but not limited to, fiber distributed data interface (FDDI), copper distributed data interface (CDDI), Ethernet (IEEE 802.3), token ring (IEEE 802.7), wireless computer communication (IEEE 802.11), Bluetooth (IEEE 802.17.1), and the like. Similarly, network devices 720 can connect to WAN technologies including, but not limited to, point to point links, circuit switching networks like integrated services digital networks (ISDN), packet switching networks, and digital subscriber lines (DSL).

Figure 8:
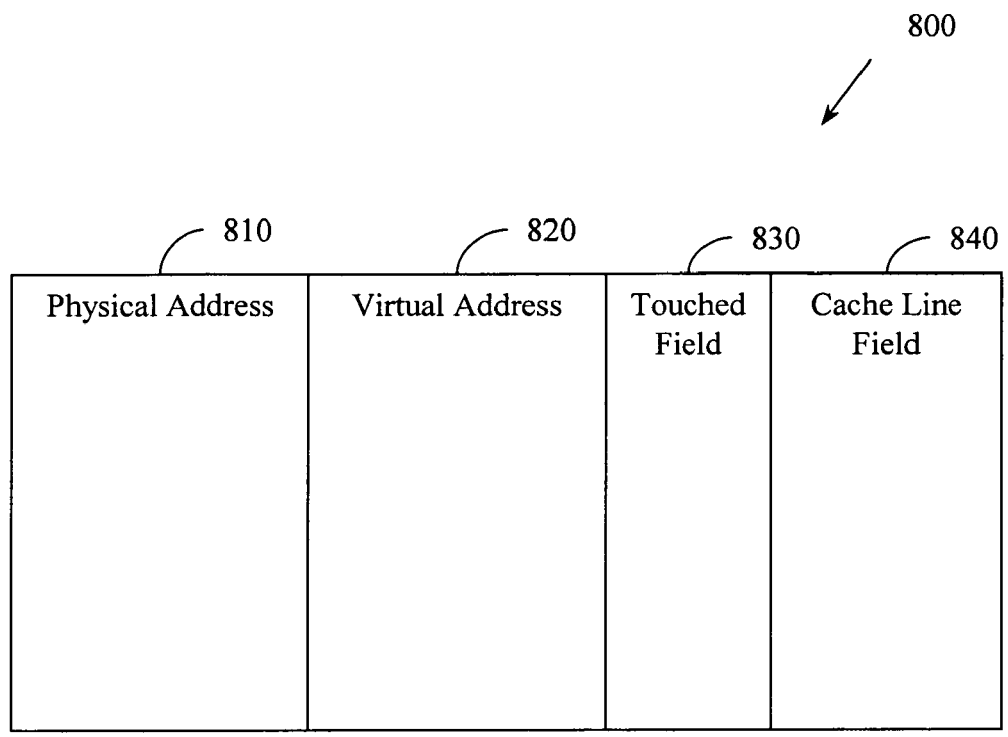
FIG. 8 illustrates an example TLB with additional fields that facilitate saving cache state and/or TLB state.

FIG. 8 illustrates an example TLB 800 with additional fields for saving cache state and/or TLB state. The physical address field 810 and virtual address field 820 are well known in the art. The touched field 830 may be, for example, a single bit field that indicates whether a TLB entry has been accessed by a process since the last context switch experienced by a processor interacting with TLB 800. For example, when either the physical address field 810 or virtual address field 820 are read and/or manipulated, the touched field 830 may be set. The cache line field 840 may be, for example, a vector having one bit for each cache line mapped to the TLB entry. For example, a cache may map 32 cache lines to each TLB entry and thus the cache line field may be 32 bits wide. Each bit in the vector may be used to indicate whether a corresponding cache line was accessed by a process since the last context switch experienced by the processor interacting with TLB 800. By saving the virtual address 820 and the cache line field 840 in a data store when a process is swapped out, state (e.g., cache contents) may be recreated for the process when it is swapped back in. This facilitates reducing penalties associated with context switching.

Figure 9:
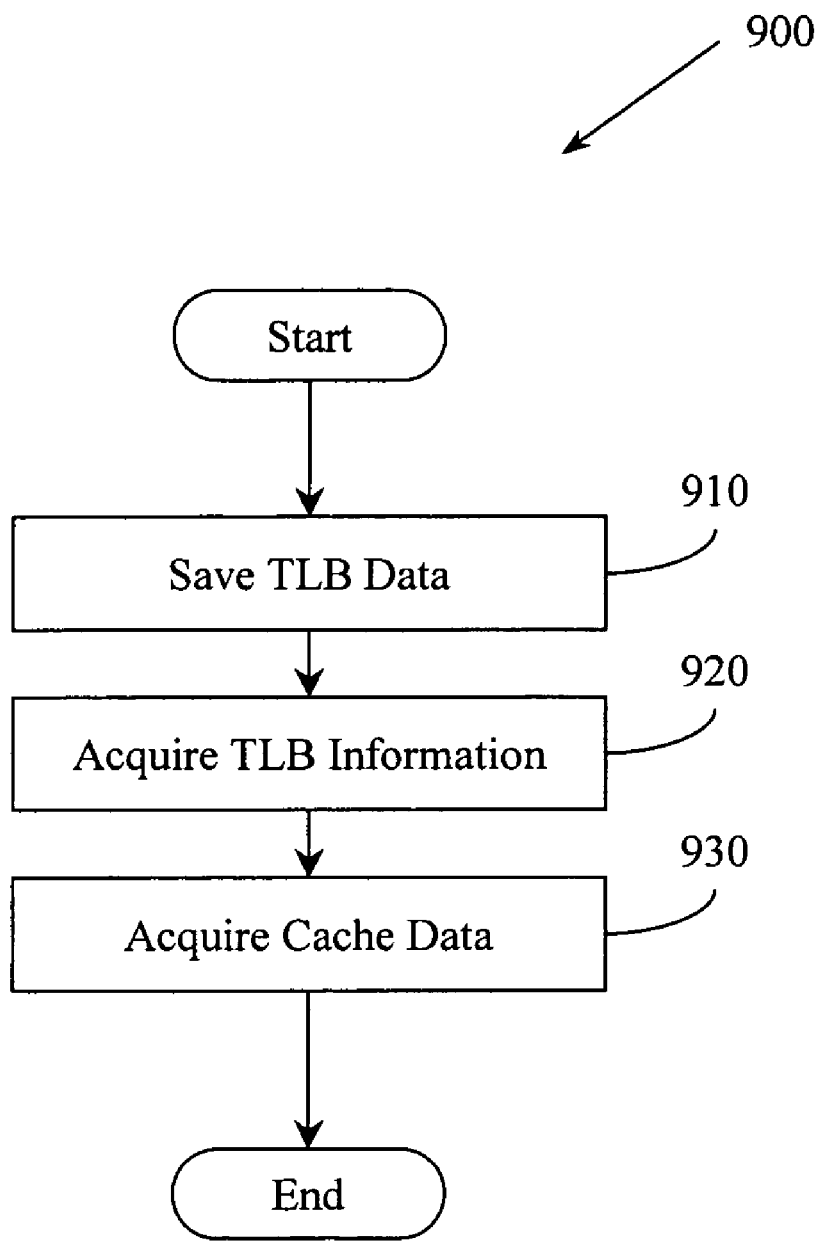
FIG. 9 illustrates an example method associated with context switching and cache state and/or TLB state.

FIG. 9 illustrates an example method 900 that is associated with context switching and cache state and/or TLB state. Method 900 may include, at 910, saving a first translation lookaside buffer data for a first process being context switched out of the processor. This first data may include address and mapping information that will allow TLB and/or cache state to be recreated for the swapped out process when it is subsequently swapped back in.

Method 900 may also include, at 920, selectively acquiring a second translation lookaside buffer data for a second process being context switched into the processor. This second data may also include address and mapping information that will allow TLB and/or cache state to be recreated for the swapped in process.

Thus, method 900 may include, at 930, using the second data to control selectively acquiring a value(s) from memory and storing the value(s) in the cache to recreate the state for the process that is being swapped in. Since portions of method 900 may be performed substantially in parallel with an executing process, method 900 may also include, not illustrated, detecting a TLB miss while values are being selectively acquired and vectoring an interrupt associated with the TLB miss to a context load interrupt service routine.

Since method 900 has information about processes available when they are swapped in and swapped out, method 900 may also perform a characterizing role. For example, method 900 may include, not illustrated, acquiring a working set data that characterizes a working set property of the process being swapped in and/or the process being swapped out.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
   a data store;
   a memory;
   a processor configured to run a multiprocessing, virtual memory operating system, the processor being operably connected to the memory, the processor comprising:
     a cache;
     a TLB configured to store one or more TLB entries, a TLB entry comprising:
       a physical address;
       a virtual address;
       a touched field; and
       a cache line field; and
     a context control logic configured to selectively copy from the TLB to the data store a first data associated with a first process being unloaded from the processor,
     the context control logic also being configured to copy from the data store to the TLB a second data associated with a second process being loaded into the processor,
     the context control logic also being configured to copy a third data from the memory to the cache, the third data being selected based, at least in part, on the second data.

2. The system of claim 1, the first data comprising a virtual address and a cache line field value, the first data being selected from a TLB entry based, at least in part, on the value of the touched field in the TLB entry.

3. The system of claim 1, the context control logic being configured to copy the second data and to copy the third data asynchronously with respect to other instructions performed by the processor after an RFI (Return From Interrupt) is issued by the processor.

4. The system of claim 1, comprising:
   a performance monitoring logic configured to acquire information concerning one or more of, how many cache lines are used by a process executing on the processor, how many TLB entries are used by a process executing on the processor, addresses used by a process executing on the processor, and addresses shared by two or more processes executing on the processor.

5. The system of claim 1, the operating system being configured with an interrupt service routine configured to collectively handle TLB misses that occur after a context load instruction begins executing and before the context load instruction completes.

6. A method, comprising:
   determining that a context switch is in progress on a processor configured with a TLB (translation lookaside buffer);

identifying a TLB data associated with an outbound process; and selectively copying the TLB data to a data store.

7. The method of claim 6, where identifying the TLB data associated with the outbound process comprises examining TLB entries to determine whether a TLB entry has been modified by the outbound process, the TLB data comprising a virtual address and a value relating the TLB entry to one or more cache lines.

8. The method of claim 6, including computing one or more performance monitoring data from the TLB data, the performance monitoring data including at least one of, a cache line count, a TLB entry count, and a shared address identifier.

9. A method, comprising:
  determining that a context switch is in progress on a processor configured with a TLB (translation lookaside buffer);
  determining that an inbound process has a stored TLB information available;
  acquiring the stored TLB information; and
  writing the stored TLB information to the TLB.

10. The method of claim 9, the stored TLB information comprising a virtual address and a value relating a TLB entry to one or more cache lines, the stored TLB information being configured to facilitate selectively acquiring values from main memory locations operably connected to the processor, the main memory locations previously having been accessed by the inbound process.

11. The method of claim 9, comprising:
  detecting that a TLB miss has occurred while the method of claim 10 is executing; and
  vectoring an interrupt associated with the TLB miss to a context load miss interrupt handler.

12. The method of claim 10, including selectively reading one or more values from one or more main memory locations operably connected to the processor and storing the one or more values in a cache memory operably connected to the processor, the main memory locations being identified by the virtual address and the value relating the TLB entry to one or more cache lines.

13. A method, comprising:
  identifying a TLB data associated with an outbound process by examining TLB entries to determine whether a TLB entry has been modified by the outbound process, the TLB data comprising a virtual address and a value relating a TLB entry to one or more cache lines;
  selectively copying the TLB data to a data store;
  determining that an inbound process has a stored TLB information available;
  acquiring the stored TLB information; and
  writing the stored TLB information to a TLB.

14. A computer-readable medium storing processor executable instructions operable to perform a method, the method comprising:
  identifying a TLB data associated with an outbound process by examining TLB entries to determine whether a TLB entry has been modified by the outbound process, the TLB data comprising a virtual address and a value relating a TLB entry to one or more cache lines;
  selectively copying the TLB data to a data store;
  determining that an inbound process has a stored TLB information available;
  acquiring the stored TLB information; and
  writing the stored TLB information to a TLB.

15. A system, comprising:
  means for determining that a process being swapped into a processor will require one or more of, a TLB resource that is unavailable, and a cache resource that is unavailable;
  means for identifying and storing TLB information and cache information associated with the process being swapped out of the processor;
  means for acquiring stored TLB information associated with a process being swapped into the processor; and
  means for acquiring TLB and cache performance information associated with one or more of, the process being swapped into the processor, and the process being swapped out of the processor.

16. A method, comprising:
  saving a first translation lookaside buffer data for a first process being context switched out of a processor configured with a translation lookaside buffer and a cache;
  selectively fetching a second translation lookaside buffer data for a second process being context switched into the processor; and
  selectively acquiring one or more values from a memory operably connected to the processor and storing the one or more values in the cache based, at least in part, on the second translation lookaside buffer data.

17. The method of claim 16, including:
  acquiring a working set data that characterizes one or more working set properties of one or more of the first process and the second process.

* * * * *